United States Patent

Sadhukhan

[11] 4,272,961
[45] Jun. 16, 1981

[54] RECOVERY OF ENERGY FROM GEOTHERMAL BRINE AND OTHER AQUEOUS SOURCES

[75] Inventor: Pasupati Sadhukhan, La Verne, Calif.

[73] Assignee: Occidental Research Corporation, Irvine, Calif.

[21] Appl. No.: 50,868

[22] Filed: Jun. 21, 1979

Related U.S. Application Data

[63] Continuation of Ser. No. 861,907, Dec. 19, 1977, abandoned.

[51] Int. Cl.$^3$ .............................................. F03G 7/04
[52] U.S. Cl. ................................. 60/641 D; 60/649; 60/673; 60/641 F; 165/104.13; 165/111; 165/104.21; 165/104.25
[58] Field of Search .................... 60/641, 649, 673; 165/104 M, 111, 106, 145, 107

[56] References Cited

U.S. PATENT DOCUMENTS

| | | | |
|---|---|---|---|
| 2,749,094 | 6/1956 | Lewis et al. | 165/107 X |
| 4,043,386 | 8/1977 | Franz et al. | 60/641 X |
| 4,084,379 | 4/1978 | Schwartzman | 60/641 |
| 4,152,898 | 5/1979 | Awerbuch | 60/641 |
| 4,167,099 | 9/1979 | Wahl et al. | 60/641 |

Primary Examiner—Martin P. Schwadron
Assistant Examiner—Stephen F. Husar
Attorney, Agent, or Firm—Max Geldin; William G. Lane; William N. Patrick

[57] ABSTRACT

A process and system for recovery of energy from geothermal brines or other hot aqueous solutions of a non-volatile solute, by direct contact heat transfer using staged evaporator-condenser units operating with a low boiling water-immiscible liquid hydrocarbon. Each stage comprises a closed vessel divided into two compartments, an evaporator and a condenser, by a bubble cap tray similar in construction to those used in distillation. Hot geothermal brine or other hot aqueous liuqid is introduced into the liquid hydrocarbon contained in the lower compartment of each stage, causing boiling of the hydrocarbon at a temperature difference of 2°–4° F. Hydrocarbon vapors pass from the evaporator compartment through the bubble caps to the upper condenser compartment where they are condensed in contact with a cooler water stream, and the condensed hydrocarbon is returned to the lower compartment. The heated water stream under substantial pressure is fed to an expander or turbine to produce work, and the expander discharge, after cooling and condensation of any steam therein, is reintroduced into the evaporator compartments of the staged units. Such recycled water, together with make-up water is introduced as feed into the condenser compartment of the last stage and passes into the respective condenser compartments of each of the preceding stages, and is further heated in each stage, and the hot brine, or the like, introduced into the evaporator compartment of the first stage is passed through the evaporator compartments of each successive stage and is further cooled in each successive stage, and is finally passed to waste.

36 Claims, 6 Drawing Figures

RECOVERY OF ENERGY FROM GEOTHERMAL BRINE AND OTHER AQUEOUS SOURCES

This is a continuation, of application Ser. No. 861,907, filed Dec. 19, 1977, now abandoned.

BACKGROUND OF THE INVENTION

1. Field of the Invention

This invention relates to the recovery of energy from geothermal brines and other hot water sources. The invention is particularly concerned with a process and system of the above type employing direct contact heat transfer between the hot brine or other hot water feed and an immiscible liquid, particularly a liquid hydrocarbon of relatively low vapor pressure, to cause boiling thereof, and effecting direct contact heat transfer between the vapor of such immiscible liquid and water to condense such vapor and heat the water, employing an arrangement of staged evaporator-condenser units for carrying out such boiling and condensation operations, and utilizing the heated water in an expander or turbine to produce work.

2. Prior Art

One of the major problems in various approaches suggested for utilization of geothermal energy is the formation of scale on the heat transfer surfaces in contact with geothermal brine. To avoid such problems flash evaporation of brine to generate steam and subsequent use of the steam for power generation or other applications have been proposed. However, in this approach a large drop of temperature will occur due to flashing and a large fraction of the total heat is lost in the brine rejected. If multi-stage flashing is performed, then the pressure of the steam in the latter stages is generally not high enough to drive a turbine.

These approaches are undesirable so far as efficient utilization of geothermal heat is concerned. To circumvent these problems multi-stage flashing of geothermal brine followed by condensation of the steam to transfer heat by indirect heat exchange to a different liquid, usually an organic liquid, has been suggested. However, the main disadvantage in the above approach is that a large surface area is still needed for heat transfer.

U.S. Pat. No. 3,988,895 to Sheinbaum discloses power generation from hot brines by passing such brine through a heat exchanger in direct contact heat exchange relation with a working fluid such as isobutane. The working fluid is vaporized and the vaporized working fluid is passed through a power extracting gas expansion device.

U.S. applications Ser. Nos. 589,068 and 611,310, both filed June 23, 1975, by S. Woinsky, disclose recovery of energy from geothermal brines by introducing the geothermal brine in a heat transfer zone in direct heat exchange relation with an organic working fluid, the heat transfer zone maintained above, at or below the critical pressure of the working fluid, and expanding the heated working fluid in an expander to produce work.

In the above prior art it is noted that the heated organic liquid is the working fluid and is employed directly as the power fluid for expansion to generate energy.

It is an object of the present invention to provide an improved process and system for recovery of energy from geothermal brines or other hot aqueous solutions of a non-volatile solute, employing direct contact heat exchange, and thereby avoiding use of metallic heat transfer surfaces. A further object is the provision of a process and system of the foregoing type, employing liquid-liquid direct contact heat exchange between an immiscible liquid and a hot aqueous solution of a non-volatile solute such as hot geothermal brine, to vaporize such immiscible liquid, and passage of such hot vapor into direct contact with a third liquid to transfer heat thereto, and utilizing the resulting third liquid for extracting energy therefrom. A particular object is to provide a process and system of the aforementioned type having high heat transfer coefficients due to intimate mixing between the brine and immiscible liquid phases, to promote boiling at low temperature differential between hot brine and immiscible liquid or hydrocarbon, and hence improved thermal efficiency.

SUMMARY OF THE INVENTION

The invention process and system for recovery of energy employs the basic principle of transferring heat from a hot aqueous solution of a non-volatile solute, particularly hot geothermal brine, to substantially fresh water through the intermediary of a liquid which is immiscible with water, preferably a hydrocarbon liquid, by evaporation of such immiscible liquid, followed by condensation of the vapor, the evaporation and condensation being carried out in direct contact with the hot aqueous solution and with water, respectively. Thus, the evaporation of the immiscible or hydrocarbon liquid is carried out by contacting the hot aqueous feed liquid or geothermal brine with such immiscible liquid, and the condensation of the hydrocarbon vapor is carried out by contacting such vapor with substantially fresh water, to thereby heat such water.

Thus, according to the invention process no metallic heat transfer surface is necessary, and high heat transfer coefficients are achieved due to direct contact between the hot geothermal brine or other hot aqueous feed and the immiscible liquid, and between the resulting vapor of the immiscible liquid and the fresh water. The absence of metallic heat transfer surfaces, and the compact design of the system of the present invention resulting from such high heat transfer coefficients, lead to a reduction in capital expenditure for equipment, as well as avoidance of scale formation and corrosion problems.

The operating conditions are maintained so as to insure maximum boiling of immiscible liquid or hydrocarbon in contact with the hot aqueous liquid or geothermal brine at a low temperature differential, particularly of the order of about 2°–4° F., between these two phases, and to obtain large volumetric heat transfer coefficients, ranging from about 67,000 to 156,000 Btu/ft$^3$(hr)(°F.), by direct contact between the immiscible phases. These advantageous conditions substantially reduce the sizes of the equipment required for a given rated capacity and increase the operating efficiency.

In the present invention, a plurality of condenser-evaporator units are connected together in a staged operation. Each condenser-evaporator unit has two sections, one for evaporation and the other for condensation of immiscible liquid or hydrocarbon. The two sections are separated by a number of bubble caps. Thus, hot aqueous feed or geothermal brine is introduced, preferably in the form of a jet, into the lower evaporator section of each unit, causing evaporation of the low boiling immiscible liquid or hydrocarbon and the resulting vapor passes through the bubble caps into direct contact with fresh water in the upper condenser section of each unit, causing condensation of the vapor and heating of the water. The condensed immiscible liquid in the condenser section is then returned or recycled by gravity from the upper condenser section to the lower evaporator section.

The geothermal brine is introduced into the evaporator section of the first stage, and then successively into the evaporator sections of each subsequent stage to the last stage, the temperature of the hot brine being reduced successively in each of the stages. The fresh water feed is introduced first into the condenser section of the last stage of the process and passes successively to the condenser sections of each previous stage to the first stage, the temperature of the fresh water increasing in each successive stage from the last stage to the first stage.

Thus, the immiscible liquid or hydrocarbon medium remains static or stationary in each stage, that is, such liquid does not flow from one stage to the next.

The pressure in the respective stages of the process and system are substantially different. The pressure in each stage increases successively from the last stage to the first stage. Thus, as the fresh water passes from the condenser section of the last stage to the condenser section of each preceding stage to the first stage, the temperature of such water increases from stage to stage and the pressure also increases from stage to stage, so that the fresh water in the condenser section of the first stage has the highest temperature and corresponding highest pressure. The pressure is increased in each stage from the last stage to the first stage so as to maintain the fresh water essentially in the liquid phase throughout the stages as the temperature of the fresh water in each stage from the last stage to the first stage also increases. For this purpose a pump is required between stages for the fresh water, for pumping same from the last stage to each of the preceding stages of higher pressure and finally to the first stage.

The immiscible liquid medium is a relatively low vapor pressure liquid having a boiling point lower than that of water. Preferably such immiscible liquid is an organic liquid, particularly a hydrocarbon. Such hydrocarbons can be paraffinic hydrocarbons containing from 4 to 7 carbon atoms, such as normal and branched chain butanes, normal and branched chain pentanes, normal and branched chain hexanes and normal and branched chain heptanes. Mixtures of such hydrocarbons also can be employed. Other hydrocarbons also can be utilized such as cyclohexane, benzene, mixtures thereof, and mixtures of any of the above paraffinic hydrocarbons, or hydrocarbon mixtures with benzene and cyclohexane, or mixtures of benzene and cyclohexane.

Although not preferred, immiscible liquids which are more dense than water can be employed, such as chloroform, carbontetrachloride, and dichloromonofluoromethane, provided such higher density liquids also have a boiling point lower than water.

The immiscible or hydrocarbon liquids can have a boiling range from about 60° to about 97° C. at atmospheric pressure.

Preferred immiscible hydrocarbon liquids which can be employed in the process and system of the invention are normal and branched chain butanes, normal and branched chain pentanes, normal and branched chain hexanes, and mixtures thereof.

The hot aqueous solution from which energy can be recovered according to the invention process and system can be any aqueous solution containing a non-volatile solute, particularly salts such as sodium chloride, the invention being particularly directed to recovery of energy from hot geothermal brines.

Thus, the present invention is directed broadly to a process for recovery of energy from hot aqueous liquids containing a non-volatile solute, including geothermal brines, by direct contact heat transfer, which comprises in each stage of a plurality of interconnected like stages, directly contacting a hot aqueous first liquid, e.g. geothermal brine, with a water immiscible second liquid having a boiling point lower than such hot liquid in an evaporator zone, causing such immiscible liquid to boil, contacting the vapor of the immiscible liquid generated during such boiling with cooler water in a condenser zone, causing condensation of such vapor and heating such water by transfer of latent heat from the condensing vapor, and recycling the condensed immiscible liquid from the condenser zone to the evaporator zone.

The hot water in substantially liquid form, and which is under substantial pressure in the condenser zone of the first stage evaporator-condenser unit, is expanded in an expander to produce work. A mixture of water and steam is discharged from the expander, the steam is condensed and combined with the water, and such water together with fresh make-up water is recycled as feed to the condenser section of the last stage of the interconnected evaporator-condenser stages.

The spent cooled aqueous solution of non-volatile solute, e.g. brine, discharged from the evaporator section of the last stage is removed as a waste stream.

DETAILED DESCRIPTION OF THE INVENTION

The invention will be described in greater detail below, taken in connection with the accompanying drawing illustrating certain preferred embodiments, and wherein.

Figure 1:
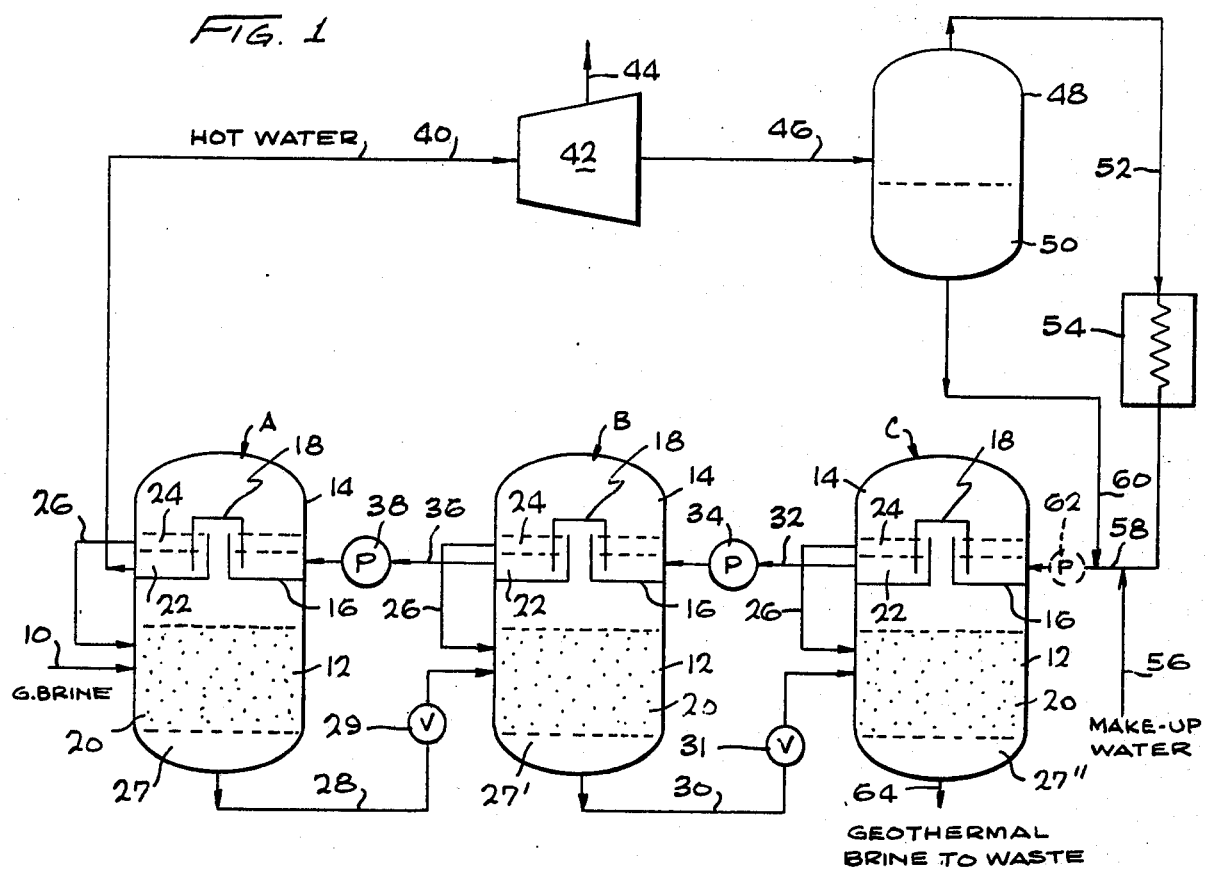
FIG. 1 is a diagramatic flow sheet illustrating the process and system of the invention employing staged evaporator-condenser units.

Referring to FIG. 1, hot geothermal brine, e.g. at a well-head temperature of about 400° F. to 600° F., and at a pressure of 250 to 850 psia, is introduced at 10 into the first stage unit A of a series of like evaporator-condenser units, shown as three in number, and including the two subsequent stage units B and C. It will be understood that the number of such stages or evaporator-condenser units can be varied and can be less than three or more than three, depending on the conditions of operation. Each of the evaporator-condenser units contains a lower evaporator section 12 and an upper condenser section 14, separated by an intermediate bubble cap tray 16 between the evaporator and condenser sections, the bubble cap tray 16 containing a plurality of bubble caps of the conventional type, one of which is illustrated at 18.

A body of liquid hydrocarbon, n-pentane, for example, indicated at 20, is maintained in the lower evaporator section 12 of each of the evaporator-condenser units.

Introduction of the hot geothermal brine into the pool of liquid n-pentane 20 in the evaporator section of the first stage unit A produces boiling of the hydrocarbon, and such boiling is maintained during continuous introduction of the hot geothermal brine into the unit A.

For successful operation of the invention process an essential criterion is the provision of conditions which provide intense continuous boiling of the liquid hydrocarbon in each of the stages. The intensity of boiling depends upon the intensity of mixing between the two phases. The Reynolds number with which the hot geothermal brine flows into the hydrocarbon phase can be taken as a measure of the extent of such mixing. The results of experiments show that for an inlet Reynolds number of $8 \times 10^3$ the magnitude of the volumetric heat transfer coefficient is 67,000 Btu/(hr)(ft$^3$)(°F.) without any special design to promote mixing between phases.

Figure 2:
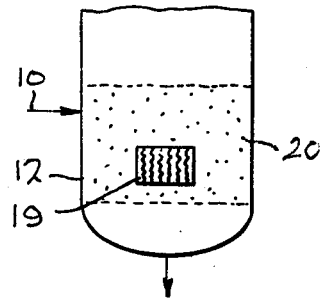
FIG. 2 illustrates the use of a wire mesh in the evaporator section of the stages to promote mixing of the liquid phases.

However, by appropriate design and incorporation of certain other components and features, intimate mixing between the hot geothermal brine and hydrocarbon phases to promote intense boiling can be assured. With such enhanced mixing, the magnitude of the volumetric heat transfer coefficient can be increased several times that of the value noted above. Thus, as seen in the FIG. 2, the use of a wire mesh block 19 in the body of liquid hydrocarbon in the evaporator section 12 to cause heterogeneous nucleation and mixing of the two phases has been found to be favorable for promoting boiling.

Figure 3:
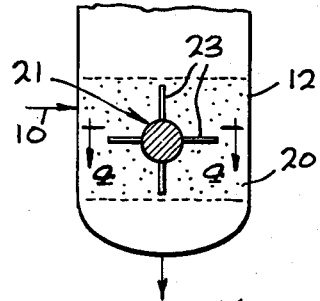
FIG. 3 illustrates a form of wheel having wire screen paddles positioned in the evaporator section of the stages to promote mixing between the liquid phases.
Figure 4:
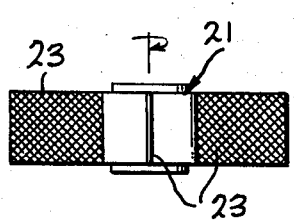
FIG. 4 is a transverse section through the wheel of FIG. 3, taken on line 4—4 of FIG. 3.
Figure 5:
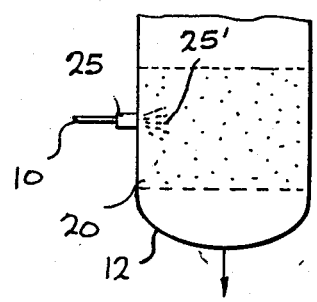
FIG. 5 illustrates introduction of a jet of hot geothermal brine into the evaporator section to enhance the heat transfer coefficient.

As illustrated in FIGS. 3 and 4, the use of a wheel 21, particularly one having wire screen paddles 23 in the evaporator section 12, which rotates to promote turbulence and mixing of the two liquid phases when the hot geothermal brine at 10 is introduced into the body of immiscible liquid or hydrocarbon 20 in the evaporator section and impinges on the wheel, also promotes boiling. Pilot plant tests employing a wheel made of wire screen placed in the evaporator, as in FIGS. 3 and 4, resulted in a volumetric heat transfer coefficient as high as 156,000 Btu/(hr)(ft$^3$)(°F.) with a temperature differential ($\Delta T$) between the hot water and the hydrocarbon of about 3.5° F. Higher coefficients of heat transfer can also be obtained by introducing the hot geothermal brine through a nozzle 25 in the form of a jet 25' at high velocity into the pool of hydrocarbon in the evaporator, as illustrated in FIG. 5.

The immiscible hydrocarbon vapor generated during boiling flows through the bubble caps 18 and is condensed in contact with a relatively cooler layer of fresh water 22 in the condenser section 14 to form a layer of hydrocarbon liquid 24 which floats on the water layer 22. The condensation of the hydrocarbon vapor in contact with the water causes the latter to become heated due to transfer of latent heat released from the condensing vapor. The thickness of the water layer 22 and the rate of flow of the water layer across the condenser should be such that substantially all of the hydrocarbon vapor bubbling through the water layer is condensed therein.

An additional amount of immiscible liquid or hydrocarbon can be added during operation for circulation between the evaporator and condenser of each stage to ensure that a hydrocarbon layer of sufficient thickness is always maintained in both chambers, particularly the evaporator. Any hydrocarbon vapor which escapes condensation in the condenser can be condensed by means of a heat exchanger (not shown). The condensed hydrocarbon, such as n-pentane, at 24 which accumulates at the top of the water layer 22 in each stage, is transferred back to the evaporator section 12 of the unit through a side tube 26. Although the pressure in the evaporator section 12 is usually slightly higher than that in the condenser section 14, the above noted transfer of condensed hydrocarbon liquid from the condenser section to the evaporator section through tube 26 can be achieved by maintaining a sufficient gravitational head of the hydrocarbon liquid in the condenser.

The geothermal brine 27 in the bottom of the evaporator section 12 of the first stage A is transferred via line 28 and valve 29 to the evaporator section 12 of the next stage B and the geothermal brine 27' from the bottom of the evaporator section of stage B, is transferred via line 30 and valve 31 to the evaporator section 12 of the last stage C. The temperature of the geothermal brine passing from the bottom of stage A and progressively to the evaporator sections of stages B and C, decreases monotonically from the first stage A to the last stage C due to the transfer of heat from the hot geothermal brine to the boiling hydrocarbon in the evaporator sections of each of the stages. However, the temperature of the hot geothermal brine entering the evaporator section 12 of the first stage A is sufficiently high, and the other conditions of operation such as the composition of the hydrocarbon in each stage, and the flow rate of the geothermal brine from the evaporator section 12 of the first stage A to the evaporator section of the last stage C, are such that the temperature of the hot geothermal brine entering the evaporator section of the last stage C is still high enough to produce boiling of the hydrocarbon therein.

In a similar manner, fresh water feed in the condenser section 14 of the last stage C is transferred from such condenser section via line 32 and pump 34 to the condenser section 14 of the second stage B, and thence from the condenser section of stage B, via line 36 and pump 38 to the condenser section 14 of the first stage A. The temperature of the water 22 in the condenser section of each stage increases as the water stream flows in the above noted manner from stage C to stages B and A, the water leaving the condenser section of stage A having the desired high temperature due to heat transfer from the hydrocarbon vapor in each of the stages to the water in the condenser section therein. Thus, it is seen that the hot geothermal brine proceeds initially to the evaporator section of the first stage unit A and then progressively through the evaporator sections of the successive stages to the last stage unit C, and the relatively cool fresh water feed proceeds countercurrently or in the opposite direction to the condenser section of the last stage unit C and then successively to the condenser sections of the preceding stages and finally to the first stage unit A.

Since the fresh water stream is being heated to successively higher temperatures in each of the condenser sections 14 in stages C, B and A, the pressures in each of these units is correspondingly increased to maintain the water substantially in liquid form in the condenser section of each stage. The pressures in the respective stages can be readily selected and optimized in accordance with the pressure of the hot geothermal brine feed to the evaporator section of each stage. Also, pressure in the respective stages can be selectively varied by the appropriate choice of liquid composition of the boiling hydrocarbon in each stage. The pressure in the respective stages A, B and C can range from about 0.2 to about 60 atmospheres absolute. Since the pressure in each of the successive stages B and C is reduced from that of the previous stage, the valves 29 and 31 are pressure reducing or throttling valves.

Each of the other evaporator-condenser stage units B and C in the system operate in substantially the same manner as the first stage A, noted above, to provide and maintain intense boiling of the liquid hydrocarbon in the evaporator section by direct contact heat transfer from the hot geothermal brine to the liquid hydrocarbon, passage of the hydrocarbon vapor through the bubble caps and into direct contact with the relatively cooler fresh water in the condenser section, to condense the hydrocarbon vapor and heat the fresh water by transfer of latent heat of vapor condensation to the fresh water, and return of condensed hydrocarbon liquid by gravity through tube 26 to the evaporator section.

Hot water, e.g. heated to a temperature of about 390° F. to 590° F. and at a pressure of about 250 to 850 psia, is fed from the condenser section of the first stage A via line 40 to the intake of an expander 42. The water may contain some steam, depending upon the operating conditions. The expander is a total flow or two phase type turbine operating on a combination of both liquid and vapor phases of the hot water discharge from the condenser section of stage A. The expander or turbine is coupled at 44 to a mechanical device or an electric generator for utilizing the power output of the turbine.

The discharge from the turbine, e.g. at a temperature of about 125° to 150° F., and a pressure of about 1.9 to about 3.7 psia is passed via line 46 to a phase separator 48, where the water is collected at 50. The steam from the phase separator is passed via line 52 to a condenser 54, wherein the steam is cooled and condensed. The condensate from condenser 54, together with make-up water at 56 are combined in line 58, and the water phase in the phase separator 48 is also introduced via line 60 into line 58. The recycled water in line 58 at a temperature of about 125° to 150° F. and at a pressure of about 1.9 to about 3.7 psia, is introduced into the condenser section 14 of the last stage C. If necessary, a pump indicated at 62 can be provided in line 58 to pump the recycled water from the turbine discharge up to the required pressure in stage C.

Figure 6:
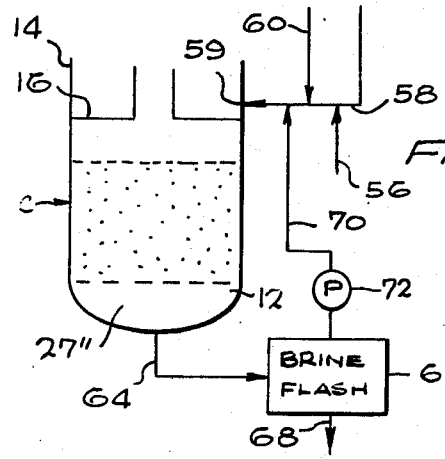
FIG. 6 illustrates a further modification of the invention process and system.

The cooled geothermal brine at 27" in the bottom of the evaporator section 12 of the last stage unit C, and at a temperature, for example, of 150° to 165° F. and at a pressure of about 3 to about 5 psia, is withdrawn at 64. As illustrated in FIG. 6 such brine can be flashed at 66 to produce low pressure steam and the spent brine at 68 passed to waste. If desired, such steam can be passed through line 70 and introduced into line 58 by means of pump 72, to heat the recycled water in line 58, prior to reintroduction of such water at 59 into the condenser section of the last stage C.

From the foregoing, it is seen that the invention provides a simple process and system of improved performance, reliability, and efficiency for recovery of energy from a hot aqueous solution of a non-volatile solute such as aqueous salt solutions, particularly from hot geothermal brine, employing the basic principles of the invention embodying direct contact heat exchange between such hot aqueous liquid and a water immiscible liquid to produce boiling thereof, and condensation of such boiling vapors with fresh water for heating same, and utilizing such heated water as the power fluid for operating a turbine.

While I have described particular embodiments of my invention for purposes of illustration, it is understood that other modifications and variations will occur to those skilled in the art, and the invention accordingly is not to be taken as limited except by the scope of the appended claims.

What is claimed is:

1. A process for recovery of energy from hot aqueous liquids containing a non-volatile solute which comprises providing a plurality of interconnected like stages, and in each stage thereof
    (a) directly contacting a hot aqueous first liquid with a water immiscible second liquid having a boiling point lower than said first hot liquid in an evaporator zone, causing said immiscible second liquid to boil and generate vapor,
    (b) contacting the vapor of said immiscible second liquid generated during said boiling with cooler water in a condenser zone,
    (c) causing condensation of said vapor of said second liquid and heating said water by transfer of latent heat from the condensing vapor,
    (d) withdrawing condensed second liquid, and
    (e) recycling said condensed immiscible second liquid from said condenser zone to said evaporator zone.

2. The process as defined in claim 1, including passing said hot first liquid cooled by the boiling of said immiscible liquid in said evaporator zone of the first stage of said plurality of stages, to the evaporator zone of a second stage, and introducing said cooler water into said condenser zone of said first stage from the condenser zone of said second stage.

3. The process as defined in claim 1, including passing said hot aqueous first liquid in said evaporator zone of the first stage of said plurality of stages, to the evaporator zone of each successive stage to the last stage, for boiling of said immiscible liquid in the evaporator zone of each stage and passing water as feed into the condenser zone of the last stage of said plurality of stages and then to the condenser zone of each preceding stage to the first stage, for condensing said vapor of said immiscible liquid in the condenser zone of each stage.

4. The process as defined in claim 3, said hot aqueous first liquid being hot geothermal brine, the spent brine withdrawn from the evaporator zone of the last stage being passed to waste.

5. The process as defined in claim 3, wherein each of the stages from the last stage and proceeding to the first stage is at a substantially higher pressure than the succeeding stage, each of the stages being at a sufficiently high pressure in relation to the temperature therein to maintain the water in the condenser zone of each stage essentially in the liquid form.

6. The process as defined in claim 5, including withdrawing hot pressurized water from the condenser zone of the first stage of said plurality of stages, and expanding said pressurized water in an expander to produce work.

7. The process as defined in claim 6, including phase separating the discharge from said expander into liquid water and water vapor phases, separating said phases, condensing the water vapor phase to liquid water, combining the condensate with the liquid water in the expander discharge and recycling the combined liquids as feed to the condenser zone of the last stage.

8. The process as defined in claim 7, said hot aqueous first liquid being geothermal brine, said cooler water being fresh water, and said immiscible liquid being a hydrocarbon.

9. The process as defined in claim 8, said hydrocarbon being selected from the group consisting of normal and branched chain butanes, pentanes, hexanes, and mixtures thereof.

10. The process as defined in claim 1, said hot aqueous first liquid being geothermal brine, said cooler water being fresh water, and said immiscible liquid being a hydrocarbon.

11. The process as defined in claim 10, said hydrocarbon being a paraffinic hydrocarbon containing from 4 to 7 carbon atoms.

12. The process as defined in claim 10, said hydrocarbon being selected from the group consisting of normal and branched chain butanes, pentanes, hexanes, and mixtures thereof.

13. The process as defined in claim 1, including providing bubble caps in each of said plurality of stages, separating the evaporator zone and the condenser zone thereof, whereby the vapor of said immiscible liquid generated in said evaporator zone of each stage flows through said bubble caps and is condensed in contact with said cooler water in the condenser zone of each stage.

14. A system for recovery of energy from a hot aqueous liquid containing a non-volatile solute including geothermal brine, by direct contact heat transfer, which comprises
(a) a plurality of unitary evaporator-condenser stages, each stage comprising a lower evaporator chamber and an upper condenser chamber,
(b) means for introducing said hot aqueous liquid into the evaporator chamber of the first stage of said evaporator-condenser stages, into contact with an immiscible liquid therein to permit boiling of said immiscible liquid and generation of vapor,
(c) a first conduit interconnecting the evaporator chambers of each of said stages, for passage of said hot aqueous liquid from the evaporator chamber of said first stage to the evaporator chambers of succeeding stages to the last stage,
(d) means for introducing water into the condenser chamber of the last stage of said evaporator-condenser stages,
(e) a second conduit interconnecting the condenser chambers of each of said stages for passage of said water from the condenser chamber of the last stage successively into the condenser chambers of the preceding stages to the first stage,
(f) means between the evaporator chamber and the condenser chamber of each of said stages to permit passage of the vapor of said immiscible liquid from said evaporator chamber to the condenser chamber in each stage for heating said water and condensing said vapor,
(g) means interconnecting the condenser chamber and the evaporator chamber of each of said stages for withdrawing and recycling condensed immiscible liquid from said condenser chamber to said evaporator chamber in each stage, each of the stages being pressurized, successive stages from the last stage to the first stage being pressurized to a successively higher pressure,
(h) means for withdrawing the hot pressurized water from the condenser chamber of said first stage, and
(i) means for recovering the energy from said hot pressurized water.

15. A system as defined in claim 14, said means between the evaporator chamber and the condenser chamber of each stage including a bubble cap tray and a plurality of bubble caps thereon.

16. The system as defined in claim 14, including means for pumping said water from the condenser chamber of said last stage, to the condenser chamber of each preceding stage to the first stage, said means interconnecting the condenser chamber and the evaporator chamber of each of said stages, being a conduit permitting passage of condensed immiscible liquid by gravity from the condenser chamber to the evaporator chamber.

17. The system as defined in claim 14, said means for recovery of energy from said hot pressurized water withdrawn from the condenser chamber of said first stage including a turbine, means for introducing said hot pressurized water into said turbine, and conduit means interconnecting the discharge of said turbine with the condenser chamber of said last stage for recycling discharged water from said turbine to the condenser chamber of said last stage.

18. The system as defined in claim 17, wherein said aqueous solution of a non-volatile solute is hot geothermal brine and said immiscible liquid is a liquid hydrocarbon, said turbine being a total flow turbine for operation employing a two-phase water-steam mixture withdrawn from the condenser chamber of said first stage.

19. The system as defined in claim 17, including a phase separator, conduit means for introducing the discharge containing steam and water from said turbine into said phase separator, a condenser, conduit means interconnecting said phase separator and said condenser for condensing steam withdrawn from said phase separator, conduit means for combining the water from said phase separator with the condensate from said condenser and for recycling said combined water and condensate as feed to the condenser chamber of said last stage.

20. The system as defined in claim 18, including a phase separator, conduit means for introducing the discharge containing steam and water from said turbine into said phase separator, a condenser, conduit means interconnecting said phase separator and said condenser for condensing steam withdrawn from said phase separator, conduit means for combining the water from said phase separator with the condensate from said condenser and for recycling said combined water and condensate as feed to the condenser chamber of said last stage, and including means for introducing make-up water into the water recycled as feed to the condenser chamber of said last stage.

21. The system as defined in claim 19, including a pump in said conduit means for recycling water to the condenser chamber of said last stage, for increasing the pressure of the recycled water feed to the pressure in said last stage.

22. The system as defined in claim 14, including means in said evaporator chamber to promote mixing of said water and said immiscible liquid.

23. The system as defined in claim 22, said last mentioned means comprising a wheel having wire screen paddles, and mounted for rotation by impingement thereon of said hot water introduced in said evaporator chamber.

24. The system as defined in claim 22, said last mentioned means comprising a wire mesh.

25. The system as defined in claim 22, said last mentioned means including means for introducing a jet of hot feed water into said evaporator chamber.

26. A system for recovery of energy from hot geothermal brine by direct contact heat exchange, which comprises a plurality of unitary evaporator-condenser stages, each stage comprising
- (a) a lower evaporator chamber containing hot geothermal brine and a water immiscible liquid having a density and boiling point lower than water, and an upper condenser chamber containing cooler fresh water and said liquid,
- (b) bubble cap tray means between the evaporator chamber and the condenser chamber, said hot geothermal brine in the evaporator chamber in each of said stages maintaining said liquid at its boiling point and generating vapors of said liquid, said vapors flowing through said bubble cap tray means into contact with said fresh water in said condenser chamber and causing condensation of said vapors in said fresh water to form two liquid phases, and
- (c) a pipe interconnecting the condenser chamber and the evaporator chamber in each of said stages for passage of said immiscible liquid by gravity from the condenser chamber to the evaporator chamber;
- (d) an inlet for hot geothermal brine to the evaporator chamber of the first stage,
- (e) a fresh water inlet to the condenser chamber of the last stage,
- (f) a first conduit interconnecting the evaporator chambers of each of said stages for passage of said hot geothermal brine from the evaporator zone of said first stage to the evaporator zone of a second stage and to the evaporator zone of succeeding stages until the last stage is reached,
- (g) a second conduit interconnecting the condenser chambers of each of said stages,
- (h) pumps in said second conduit for pumping liquid from the condenser chamber of the last stage to the condenser chamber of the second to the last stage and successively to the condenser chambers of each of the preceding stages up to the condenser chamber of said first stage, each of the stages from the last stage to the first stage being maintained at a successively higher pressure, the pressure in each of the stages being at a sufficiently high pressure in relation to the temperature therein to maintain said fresh water in the condenser chamber of each of said stages essentially in the liquid form,
- (i) a turbine,
- (j) a third conduit for passage of hot pressurized water from the condenser chamber of the first stage to the inlet of said turbine,
- (k) a phase separator,
- (l) a fourth conduit for passage of water and steam discharged from said turbine to said phase separator,
- (m) a condenser,
- (n) a fifth conduit for introducing steam from said phase separator into said condenser, for condensing said steam, and
- (o) a sixth conduit for combining the water from said phase separator with the condensate from said condenser, and introducing said combined water as feed through said inlet to the condenser chamber of said last stage, and
- (p) means for introducing make-up water into said last-mentioned conduit.

27. A system as defined in claim 26, including means for withdrawing cooled geothermal brine from the evaporator chamber of said last stage, means for flashing said cooled withdrawn brine, and means for introducing the resulting flashed steam into said sixth conduit for further heating the feed water therein.

28. A process for recovering energy from hot geothermal brine by direct contact heat exchange in a plurality of stages, each of said stages comprising a lower evaporator zone and an upper condenser zone, and bubble cap means between and separating said evaporator zone and said condenser zone, said process comprising:
- (a) introducing hot geothermal brine into the evaporator zone of the first stage of said plurality of stages,
- (b) withdrawing geothermal brine from the evaporator zone of the first stage and introducing it into the evaporator zone of the second stage of said plurality of stages, thereby transferring geothermal brine from one stage to the next succeeding stage of said plurality of stages,
- (c) by the method of step (b), transferring geothermal brine from one stage to the next succeeding stage until said geothermal brine reaches the last stage of said plurality of stages,
- (d) withdrawing geothermal brine from said last stage,
- (e) introducing fresh water into the condenser zone of the last stage of said plurality of stages,
- (f) withdrawing fresh water from the condenser zone of the last stage and introducing it into the condenser zone of the second to the last stage of said plurality of stages, thereby transferring fresh water from one stage to the next preceding stage of said plurality of stages,
- (g) by the method of step (f), transferring fresh water from one stage to the next preceding stage until said fresh water reaches the first stage of said plurality of stages,
- (h) introducing or providing a liquid hydrocarbon in each said stage, said liquid hydrocarbon having a boiling point and a density lower than water,
- (i) causing said hydrocarbon to boil in the evaporator zone in each stage and generate hydrocarbon vapor by the exchange of heat by direct contact between said brine and said liquid hydrocarbon,
- (j) maintaining said hydrocarbon at its boiling point in each said evaporator zone of each stage, thereby causing said hydrocarbon vapors to flow through said bubble cap means into contact with relatively cooler fresh water in the condenser zone in each such stage,
- (k) causing the condensation of said hydrocarbon vapors and the heating of said fresh water by the direct transfer of latent heat from said hydrocarbon vapors to said water and forming a condensed hydrocarbon liquid in contact with said water,
- (l) recycling the condensed hydrocarbon liquid from said condenser zone to said evaporator zone in each stage,
- (m) withdrawing hot fresh water from the condenser zone of said first stage, and
- (n) recovering energy from said hot fresh water.

29. The process as defined in claim 28, wherein each of the stages from the last stage and proceding to the first stage is at a successively higher pressure, each of said stages being at a sufficiently high pressure in relation to the temperature therein to maintain the water in the condenser zone of each stage essentially in the liquid form, said recovery of energy from said hot withdrawn water including introducing the hot pressurized water from the condenser zone of said first stage into an expander to produce work, and recycling the discharge from said expander to the condenser zone of said last stage.

30. The process as defined in claim 29, including separating the discharge from said expander into liquid water and water vapor phases, separating said phases, cooling and condensing the water vapor phase to liquid water, combining the condensate with the liquid water in the expander discharge and recycling the combined liquids as feed to the condenser zone of the last stage.

31. The process as defined in claim 30, including flashing said brine withdrawn from said last stage, and introducing the flashed water vapor into the recycled water for further heating the same.

32. The process as defined in claim 30, wherein said hydrocarbon is selected from the group consisting of normal and branched chain butanes, pentanes, hexanes, and mixtures thereof.

33. A process for recovering energy from hot geothermal brine by direct contact heat exchange in a plurality of stages, each of said stages comprising a lower evaporator zone and an upper condenser zone, and bubble cap means between and separating said evaporator zone and said condenser zone, said process comprising,
  (a) introducing hot geothermal brine into the evaporator zone of the first stage of said plurality of stages.
  (b) withdrawing geothermal brine from the evaporator zone of the first stage and introducing it into the evaporator zone of the second stage of said plurality of stages, thereby transferring geothermal brine from one stage to the next succeeding stage of said plurality of stages,
  (c) by the method of step (b), transferring geothermal brine from one stage to the next succeeding stage until said geothermal brine reaches the last stage of said plurality of stages,
  (d) withdrawing geothermal brine from said last stage,
  (e) introducing fresh water into the condenser zone of the last stage of said plurality of stages,
  (f) withdrawing fresh water from the condenser zone of the last stage and introducing it into the condenser zone of the second to the last stage of said plurality of stages, thereby transferring fresh water from one stage to the next preceding stage of said plurality of stages,
  (g) by the method of step (f), transferring fresh water from one stage to the next preceding stage until said fresh water reaches the first stage of said plurality of stages,
  (h) introducing or providing a liquid hydrocarbon in each said stage, said liquid hydrocarbon having a boiling point and a density lower than water,
  (i) causing said hydrocarbon to boil in the evaporator zone in each stage and generate hydrocarbon vapor by the exchange of heat by direct contact between said brine and said liquid hydrocarbon,
  (j) maintaining said hydrocarbon at its boiling point in each said evaporator zone of each stage, thereby causing said hydrocarbon vapors to flow through said bubble cap means into contact with relatively cooler fresh water in the condenser zone in each such stage,
  (k) causing the condensation of said hydrocarbon vapors and the heating of said fresh water by the direct transfer of latent heat from said hydrocarbon vapor to said water and forming a condensed hydrocarbon liquid in contact with said water,
  (l) recycling the condensed hydrocarbon liquid from said condenser zone to said evaporator zone in each stage,
  (m) withdrawing hot fresh water from the condenser zone of said first stage, and
  (n) recovering energy from said hot fresh water.

34. The process as defined in claim 33, said recovery of energy from said hot water withdrawn from the condenser zone of said first stage including introducing the hot pressurized water from the condenser zone of said first stage into an expander to produce work, and recycling the discharge from said expander to the condenser zone of said last stage.

35. The process as defined in claim 34, including
  (i) separating the discharge from said expander into liquid water and vapor phases,
  (ii) separating said phases,
  (iii) cooling and condensing the vapor phase to liquid water, and
  (iv) combining the condensate with the liquid water in the expander discharge and recycling the combined liquids as feed to the condenser zone of the last stage.

36. The process as defined in claim 35, including
withdrawing spent brine from the evaporator zone of said last stage,
flashing said brine, and
introducing said vapor from said flashed brine into the recycled water for further heating the same.

* * * * *